(12) United States Patent
Cartwright et al.

(10) Patent No.: US 6,279,951 B1
(45) Date of Patent: Aug. 28, 2001

(54) STEERING COLUMN

(75) Inventors: Mark A. Cartwright, West Lafayette; Tony L. Stevens, Lafayette, both of IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/275,715

(22) Filed: Mar. 24, 1999

(51) Int. Cl.[7] .................................................. B62D 1/18
(52) U.S. Cl. ............................ 280/775; 74/493; 74/527
(58) Field of Search ............................ 280/775; 74/493, 74/527; 188/67

(56) References Cited

U.S. PATENT DOCUMENTS

| | | | |
|---|---|---|---|
| 3,355,962 | 12/1967 | Gerdes et al. | 280/775 |
| 5,161,425 | 11/1992 | Baskett et al . | |
| 5,338,064 | 8/1994 | Sadakata et al. . | |
| 5,363,716 | 11/1994 | Budzik, Jr., et al. . | |
| 5,409,261 | 4/1995 | Yamaguchi . | |
| 5,419,581 | * 5/1995 | Schafer et al. | 280/775 |
| 5,452,624 | * 9/1995 | Thomas et al. | 280/775 |

FOREIGN PATENT DOCUMENTS

| | | |
|---|---|---|
| 0497262 | 8/1992 | (EP) . |
| 807564 | 11/1997 | (EP) . |
| 0818379 | 1/1998 | (EP) . |
| 1002711 | 5/2000 | (EP) . |
| 0134371 | * 6/1988 | (JP) .................................... 280/775 |

* cited by examiner

*Primary Examiner*—Peter C. English
*Assistant Examiner*—Elaine Gort
(74) *Attorney, Agent, or Firm*—Tarolli, Sundheim, Covell, Tummino & Szabo L.L.P.

(57) ABSTRACT

An apparatus includes a pivotable steering column member associated with a vehicle steering wheel. A rod member is pivotally attached to the steering column member. The rod member has a longitudinal axis. The rod member moves longitudinally upon pivotal movement of the steering column member. The rod member has a first plurality of teeth extending transverse to the longitudinal axis. The first plurality of teeth are centered relative to a plane extending through the longitudinal axis. A lever member has a second plurality of teeth for meshing engagement with the first plurality of teeth. The lever member is fixed against movement longitudinally with the rod member. The lever member is mounted for pivotal movement about a pivot axis generally parallel to the longitudinal axis between a release position in which the first and second plurality of teeth are out of meshing engagement permitting longitudinal movement of the rod member and an engaged portion in which the first and second plurality of teeth are in meshing engagement and block longitudinal movement of the rod member. The pivot axis is offset to one side of the plane a distance generally equal to one half the length of teeth of the first plurality of teeth.

13 Claims, 3 Drawing Sheets

STEERING COLUMN

TECHNICAL FIELD

The present invention relates to a steering column, and more specifically to a steering column in which a rod member is pivotally attached to a pivotable steering column member associated with a steering wheel.

BACKGROUND OF THE INVENTION

A known steering column is disclosed in U.S. Pat. No. 5,363,716. U.S. Pat. No. 5,363,716 discloses a steering column in which a rod member is pivotally attached to a steering column member. The rod member moves longitudinally upon pivotal movement of the steering column member. A pair of coil springs are normally tightly wound around the periphery of the rod member so that, when fully wound, they grip the rod member and prevent longitudinal movement of the rod member. Rotation of a lever about an axis of the rod member causes the springs to become partially unwound and release their grip on the rod member. When the springs become unwound, the rod member can be moved longitudinally.

Another known steering column is disclosed in U.S. Pat. No. 5,409,261. U.S. Pat. No. 5,409,261 discloses a steering column in which a tilt lever is rotated so that a pressure pin projecting from a latch lever is shifted in a slot formed in the tilt lever. At the same time, a tilt bolt, fixed to the tilt lever, is loosened from a tilt nut. The distance between the pressure pin and the tilt bolt becomes greater as the pressure pin shifts in the slot. The latch lever rotates about a shaft provided in the sides of the steering column so that teeth on the latch lever disengage from teeth on a fixed bracket. At the same time, the distance between an inner side of the tilt lever and the tilt nut becomes greater. Vertical panels of the fixed bracket are released from being pressed against sides of a vertically shifting bracket fixed to the steering column. The steering column can be tilted relative to the vehicle.

SUMMARY OF THE INVENTION

The apparatus of the present invention includes a pivotable steering column member associated with a vehicle steering wheel. A rod member is pivotally attached to the steering column member. The rod member has a longitudinal axis. The rod member moves longitudinally upon pivotal movement of the steering column member. The rod member has a first plurality of teeth extending transverse to the longitudinal axis. The first plurality of teeth are centered relative to a plane extending through the longitudinal axis.

A lever member has a second plurality of teeth for meshing engagement with the first plurality of teeth. The lever member is fixed against movement longitudinally with the rod member. The lever member is mounted for pivotal movement about a pivot axis generally parallel to the longitudinal axis between a release position and an engaged position. The first and second plurality of teeth are out of meshing engagement permitting longitudinal movement of the rod member when the lever member is in the release position. The first and second plurality of teeth are in meshing engagement and block longitudinal movement of the rod member when the lever member is in the engaged position. The pivot axis is offset to one side of the plane a distance generally equal to one half the length of teeth of the first plurality of teeth.

BRIEF DESCRIPTION OF THE DRAWINGS

The foregoing and other features of the present invention will become more apparent to one skilled in the art upon consideration of the following description of the invention and the accompanying drawings in which.

DESCRIPTION OF THE PREFERRED EMBODIMENT

Figure 1:
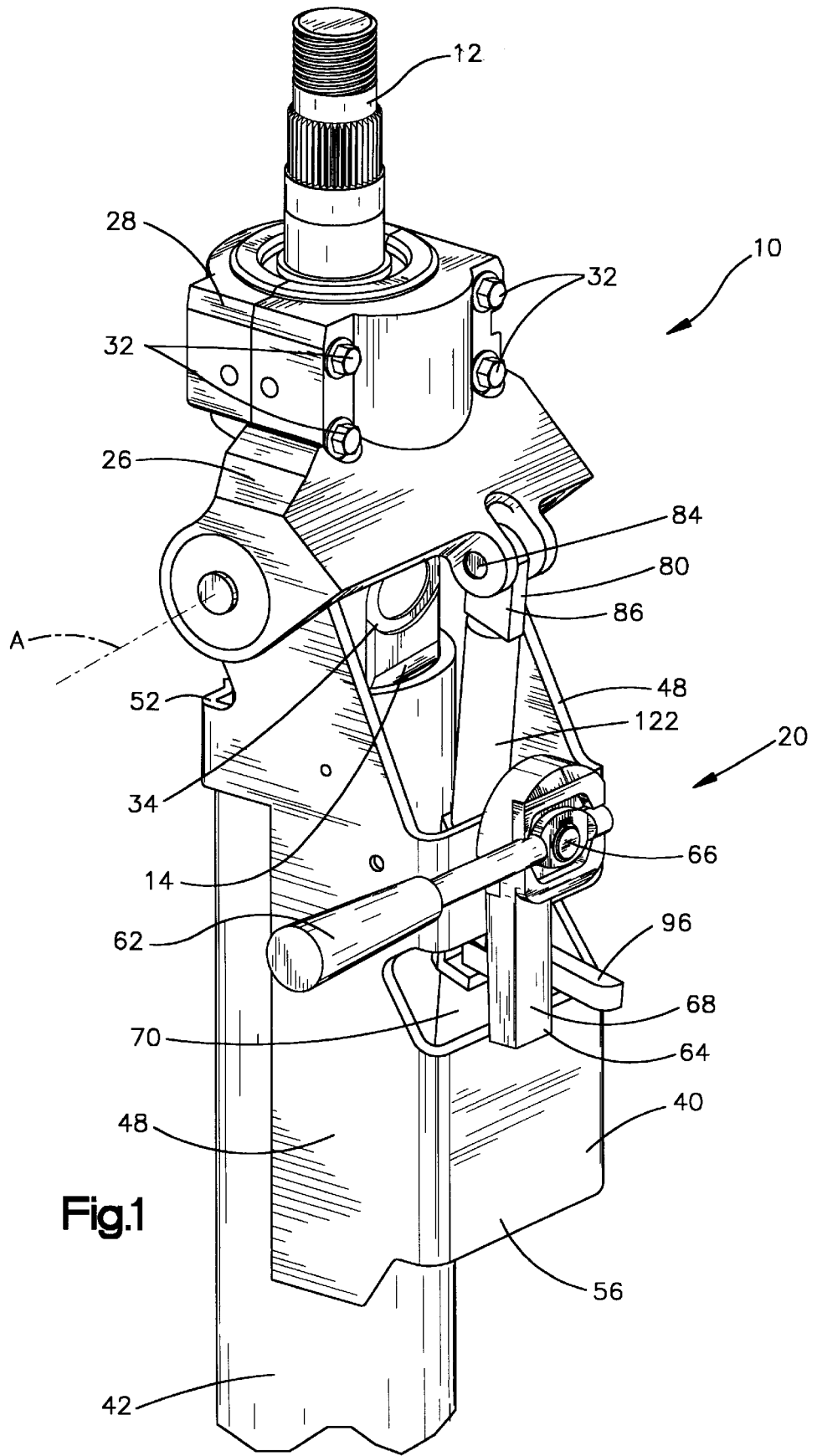
FIG. 1 is a pictorial illustration of a steering column including the apparatus of the present invention.
Figure 2:
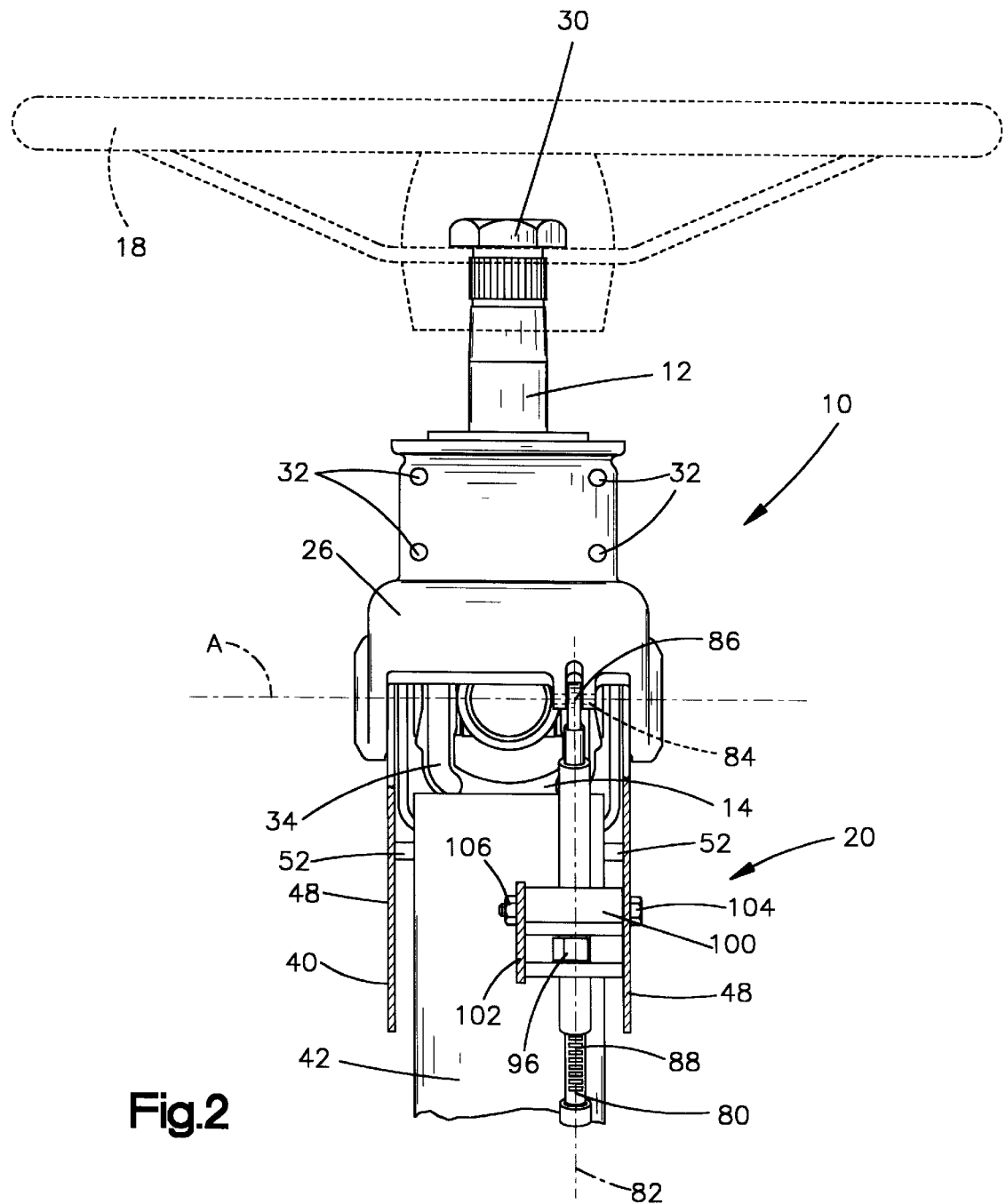
FIG. 2 is a schematic sectional view of a portion of the steering column of FIG. 1.

The present invention comprises an angularly adjustable vehicle steering column 10 (FIGS. 1 and 2). The steering column 10 is connectable to a frame of a vehicle by mounting brackets (not shown), as is well known in the art. The steering column 10 includes an input shaft or steering column member 12 and a steering column member 14 which are rotatable to move steerable wheels of a vehicle (not shown). A vehicle steering wheel 18 (FIG. 2) is attached to the steering column member 12 by a nut 30. The steering column member 12 and steering column member 14 rotate upon rotation of the vehicle steering wheel 18 by an operator of the vehicle. The steering column member 12 is pivotable relative to the steering column member 14 to affect angular adjustment of the steering wheel 18.

A releasable tilt locking mechanism 20 (FIG. 1) locks the steering column member 12 in any one of a plurality of pivot positions relative to the steering column member 14. The steering column member 12 extends into an upper housing 26. Bearings located in the upper housing 26 support the steering column member 12 for rotation relative to the upper housing. A cover 28 is removable from the upper housing 26 so that the bearings may be reached for repair and maintenance. The cover 28 (FIG. 1) is connected to the upper housing 26 by screws 32.

A universal joint 34 (FIGS. 1 and 2) interconnects the steering column members 12, 14. The steering column member 12 is connected to one yoke of the universal joint 34. Another yoke of the universal joint 34 is connected to the steering column member 14. The steering column member 12 and upper housing 26 can pivot, relative to the steering column member 14, about a pivot axis A of the universal joint 34. From the above, it should be clear that upon rotation of the steering wheel 18, the steering column member 12 and the steering column member 14 rotate.

A bracket 40 (FIG. 1) pivotally supports the upper housing 26 and steering column member 12 for pivotal movement relative to the steering column member 14. The upper housing 26 is pivotally connected to the bracket 40 which is connected to a mounting member or support tube 42 circumscribing the steering column member 14. The support tube 42 supports the steering column member 14 for rotation and connects the steering column 10 to the frame of the vehicle, as is well known in the art. The upper housing 26 is pivotable about the axis A relative to the bracket 40 and the support tube 42. Therefore, the upper housing 26 pivots along with the steering column member 12 relative to the bracket 40 and the steering column member 14.

The bracket 40 (FIG. 1) includes generally parallel side walls 48. Portions 52 extending radially inwardly from the side walls 48 are connected to an upper portion of the support tube 42. A portion 56 of the bracket 40 extends between the side walls 48. The bracket 40 partially encloses the tilt locking mechanism 20.

A handle 62 and actuator member 64, connected to the handle, are pivotally mounted on the portion 56 of the bracket 40 by a pin 66. The handle 62 and actuator member 64 release the tilt locking mechanism 20 to permit tilting of the steering column member 12 relative to the steering column member 14. A portion 68 of the actuator member 64 engages a portion of the tilt locking mechanism 20 that extends through an opening 70 in the portion 56 of the bracket 40.

A rod member 80 (FIGS. 1 and 2) having a longitudinal axis 82 is pivotally connected to the upper housing 26 by a pin 84. A flattened end 86 of the rod member 80 moves with the steering column member 12 relative to the steering column member 14. The rod member 80 moves longitudinally upon pivotal movement of the steering column member 12.

Figure 4:
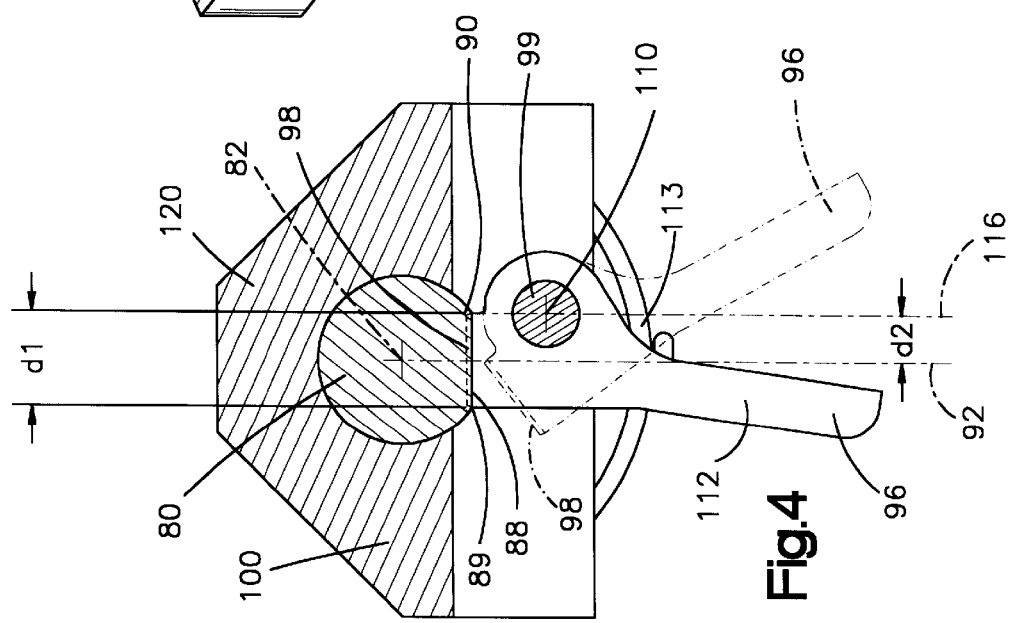
FIG. 4 is an enlarged sectional view of a portion of the apparatus of FIG. 3.
Figure 3:
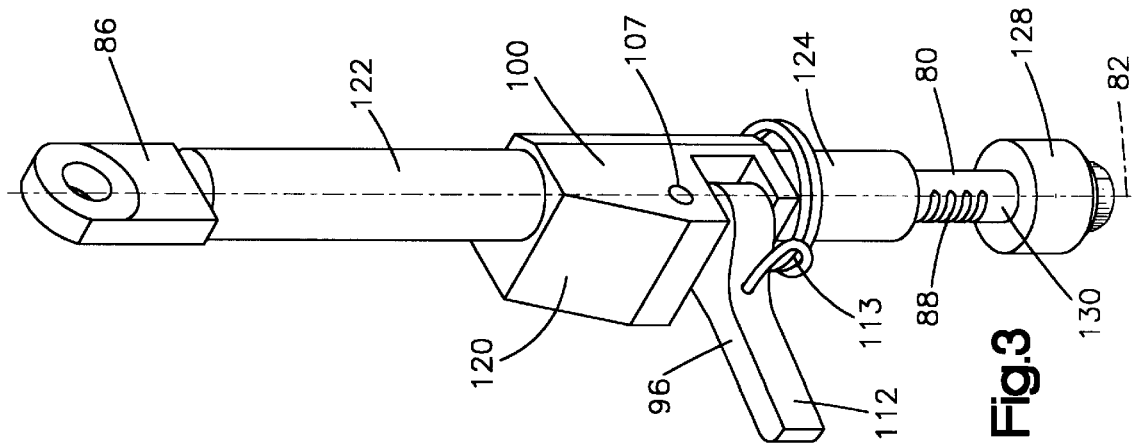
FIG. 3 is an enlarged pictorial view of the apparatus of the present invention.

The rod member 80 (FIGS. 2 and 3) has a plurality of teeth 88 extending transverse to the longitudinal axis 82. Each of the teeth 88 (FIG. 4) has terminal ends 89 and 90 and a length d1. The teeth 88 are centered relative to a plane 92 extending through the longitudinal axis 82 and perpendicular to the teeth 88.

Figure 5:
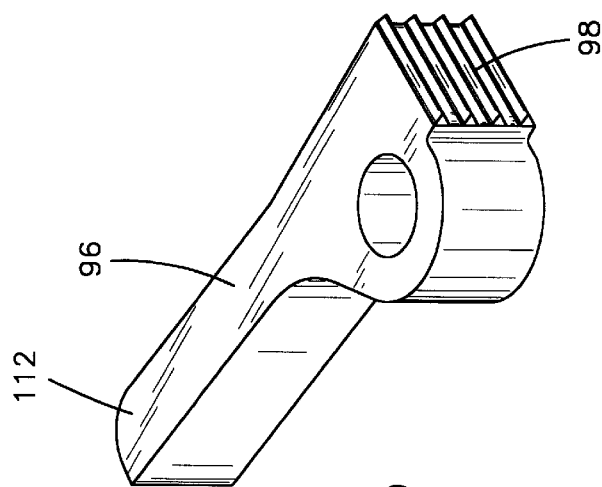
FIG. 5 is an enlarged pictorial view of a lever member of the apparatus of FIG. 3.

A lever member 96 (FIGS. 3–5) has a plurality of teeth 98 for meshing engagement with the teeth 88 on the rod member 80. The teeth 98 have a length which is generally equal to the length d1 of the teeth 88. The lever member 96 (FIG. 4) is pivotally connected by a pin 99 to a housing 100 through which the rod member 80 extends. The housing 100 is connected with the bracket 40 so that the rod member 80 moves longitudinally relative to the housing and the lever member 96. The housing 100 is pivotally connected between one of the side walls 48 and a flange 102 extending from the portion 56 of the bracket 40 by a bolt 104 and a nut 106. The bolt 104 extends through an opening 107 (FIG. 3) in the housing 100.

The lever member 96 (FIG. 4) is mounted for pivotal movement relative to the housing 100 about a pivot axis 110. The axis 110 extends generally parallel to the longitudinal axis 82 of the rod member 80. The lever member 96 has a release position, shown in dot-dash lines in FIG. 4, in which the teeth 98 on the lever member are out of meshing engagement with the teeth 88 on the rod member 80 to permit longitudinal movement of the rod member. The lever member 96 has an engaged position in which the teeth 98 are in meshing engagement with the teeth 88 to prevent longitudinal movement of the rod member 80.

The portion 68 (FIG. 1) of the actuator member 64 engages an extension 112 of the lever member 96. The extension 112 extends through the opening 70 in the bracket 40. A torsion spring 113 (FIG. 3) has one end connected to the lever 96 and another end connected to the housing 100. The spring 113 biases the lever member 96 into engagement with the actuator member 64 and the lever member into the engaged position. The spring 113 biases the actuator member 64 and the handle 62 to an initial position in which the tilt locking mechanism 20 is locked.

The pivot axis 110 (FIG. 4) of the lever member 96 is offset to one side of the plane 92 a distance d2 which is generally equal to one half the length d1 of the teeth 88. Furthermore, a line 116 extending parallel to the plane 92 and through the pivot axis 110 intersects a terminal end 90 of the teeth 88.

The housing 100 (FIG. 3) has a main body portion 120 and two cylindrical portions 122 and 124 extending from axially opposite sides of the main body portion. It is contemplated that a compression spring may circumscribe the portion 122 and engage the body portion 120 and the end 86 of the rod member 80 to bias the steering column member 12 to pivot in one direction.

A stop 128 is connected to an end 130 of the rod member 80 opposite from the end 86. The stop 128 engages the portion 124 of the housing 100 to limit the pivoting of the steering column member 12 in the one direction. The end 86 engages the portion 122 to limit pivoting of the steering column member 12 in the opposite direction.

Upon pivoting the handle 62 and, therefore, the actuator member 64, downward, as viewed in FIG. 1, from the initial position, the portion 68 of the actuator member moves toward the lever member 96. The actuator member 64 moves the lever member 96 to release the rod member 80 and permit pivoting of the steering column member 12 relative to the steering column member 14. When the steering column member 12 is pivoted relative to the steering column member 14, the rod member 80 moves longitudinally relative to the housing 100 and the housing pivots about the bolt 104. Upon release of the handle 62 after positioning the steering column member 12, the spring 113 moves the teeth 98 on the lever member 96 into engagement with the teeth 88 on the rod member 80. The spring 113 and the lever member 96 move the handle 62 and the actuator member 64 to the initial position.

From the above description of the invention, those skilled in the art will perceive improvements, changes and modifications. It is contemplated that the steering column may be a tilt-telescope steering column in which the length of the steering column may be adjusted also. Such improvements, changes and modifications within the skill of the art are intended to be covered by the appended claims.

Having described the invention, the following is claimed:

1. Apparatus comprising:

a pivotable steering column member associated with a vehicle steering wheel;

a rod member pivotally attached to said steering column member, said rod member having a longitudinal axis, said rod member moving longitudinally upon pivotal movement of said steering column member;

said rod member having a first plurality of teeth extending transverse to said longitudinal axis, said first plurality of teeth being centered relative to a plane extending through said longitudinal axis;

a lever member having a second plurality of teeth for meshing engagement with said first plurality of teeth;

said lever member being fixed against movement longitudinally with said rod member and being mounted for pivotal movement about a pivot axis extending generally parallel to said longitudinal axis between a release position in which said first and second plurality of teeth are out of meshing engagement permitting longitudinal movement of said rod member and an engaged position in which said first and second plurality of teeth are in meshing engagement and block longitudinal movement of said rod member, said pivot axis being offset to one side of said plane a distance generally equal to one half the length of the teeth of said first plurality of teeth.

2. An apparatus as defined in claim 1 wherein all of the teeth of said first plurality of teeth are of the same length and all of the teeth of the second plurality of teeth are of the same length.

3. An apparatus as defined in claim 2 wherein the length of the teeth of said first plurality of teeth is generally equal to the length of the teeth of said second plurality of teeth.

4. An apparatus as defined in claim 3 wherein a line extending parallel to said plane and extending through said pivot axis intersects a terminal end of the teeth of said first plurality of teeth.

5. An apparatus as defined in claim 1 further including a spring biasing said lever member to the engaged position.

6. An apparatus as defined in claim 1 wherein a line extending parallel to said plane and extending through said pivot axis intersects a terminal end of the teeth of said first plurality of teeth.

7. Apparatus comprising:

a pivotable steering column member associated with a vehicle steering wheel;

a rod member pivotally attached to said steering column member, said rod member having a longitudinal axis, said rod member moving longitudinally upon movement of said steering column member;

said rod member having a first plurality of teeth extending transverse to said longitudinal axis, said first plurality of teeth being centered relative to a plane extending through said longitudinal axis;

a lever member having a second plurality of teeth for meshing engagement with said first plurality of teeth;

said lever being fixed against movement longitudinally with said rod member and being mounted for pivotal movement about a pivot axis generally parallel to said longitudinal axis between a release position in which said first and second plurality of teeth are out of meshing engagement permitting longitudinal movement of said rod member and an engaged position in which said first and second plurality of teeth are in meshing engagement and block longitudinal movement of said rod member;

said pivot axis being offset to one side of said plane, and a line extending parallel to said plane and extending through said pivot axis intersecting said first plurality of teeth at a terminal end of the teeth of said first plurality of teeth.

8. An apparatus as defined in claim 7 wherein all of the teeth of said first plurality of teeth are of the same length and all of the teeth of the second plurality of teeth are of the same length.

9. An apparatus as defined in claim 8 wherein the length of the teeth of said first plurality of teeth is generally equal to the length of the teeth of said second plurality of teeth.

10. An apparatus as defined in claim 7 further including a spring biasing said lever member to the engaged position.

11. A steering column connectable to a frame of a vehicle, said steering column comprising:

first and second steering column members, said first steering column member being pivotable relative to said second steering column member;

a rod member having an end portion movable with said first steering column member relative to said second steering column member, said rod member moving relative to said second steering column member upon pivoting of said first steering column member to any one of a plurality of pivot positions relative to said second steering column member, said rod member having a longitudinal axis and a first plurality of teeth extending transverse to said longitudinal axis, said first plurality of teeth being centered relative to a plane extending through said longitudinal axis; and a lever member having a second plurality of teeth for engaging said first plurality of teeth on said rod member to prevent movement of said rod member relative to said second steering column member and prevent pivoting of said first steering column member relative to said second steering column member, said lever member having an engaged position engaging said first plurality of teeth on said rod member to prevent movement of said rod member relative to said second steering column member and a release position spaced from said first plurality of teeth on said rod member to enable movement of said rod member relative to said second steering column member and pivoting of said first steering column member relative to said second steering column member;

said lever member being mounted for pivotal movement about a pivot axis extending generally parallel to said longitudinal axis between said release position and said engaged position, said pivot axis being offset to one side of said plane a distance generally equal to one half the length of the teeth of said first plurality of teeth.

12. A steering column as set forth in claim 11 wherein a line extending parallel to said plane and extending through said pivot axis intersects a terminal end of the teeth of said first plurality of teeth.

13. A steering column as set forth in claim 12 wherein the length of all of the teeth of said first and second pluralities of teeth are the same.

* * * * *